(12) United States Patent
Oliver et al.

(10) Patent No.: US 6,513,819 B1
(45) Date of Patent: Feb. 4, 2003

(54) HYDRAULICALLY ACTUATED SWAY BAR LATCH

(75) Inventors: Michael L. Oliver, Xenia, OH (US); William C. Kruckemeyer, Beavercreek, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/723,800

(22) Filed: Nov. 28, 2000

(51) Int. Cl.[7] .............................. B60G 7/00; B60P 7/00; B62D 7/00
(52) U.S. Cl. ..................... 280/124.152; 280/124.106; 280/124.107
(58) Field of Search ....................... 280/5.506, 124.106, 280/124.107, 124.152

(56) References Cited

U.S. PATENT DOCUMENTS 4,648,620 A * 3/1987 Nuss 5,251,926 A * 10/1993 Aulerich et al.

* cited by examiner

Primary Examiner—Paul N. Dickson
(74) Attorney, Agent, or Firm—Scott A. McBain

(57) ABSTRACT

An automotive vehicle sway bar assembly includes two opposed sway bar members interconnected by a hydraulically actuated latch operable to effectively decouple the sway bar members. Alternatively, the sway bar assembly may include an integral center section interconnecting the opposed sway bar members and the latch is operable to modify the effective stiffness of the assembly. The latch includes a housing with two opposed latch members axially moveable relative to each other between fully engaged positions for transmitting torque from one sway bar member to the other or partially disengaged to effectively decouple the sway bar members from each other. An anti-backlash lock member is engageable with one sway bar latch member to reduce backlash created by a splined connection when the latch members are fully engaged with each other.

20 Claims, 3 Drawing Sheets

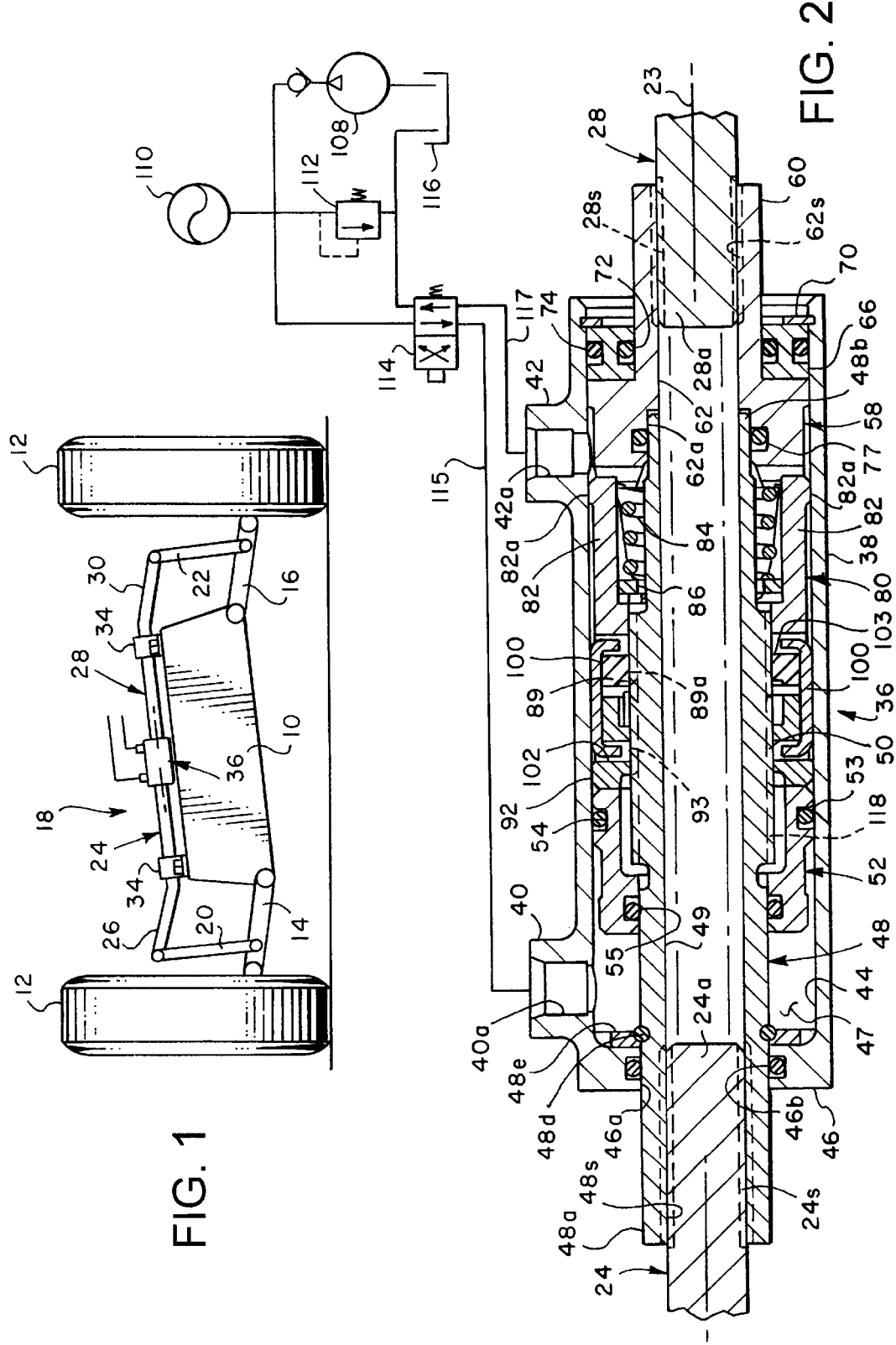

HYDRAULICALLY ACTUATED SWAY BAR LATCH

FIELD OF THE INVENTION

The present invention pertains to a sway bar or anti-roll bar for a vehicle suspension system including a hydraulically actuated latch for decoupling the sway bar from the suspension system in an on-off type control mode or for modifying the sway bar operating characteristics in a high-low type control mode.

BACKGROUND

In automotive vehicle suspension systems a sway bar, sometimes also referred to as an anti-roll bar or stabilizer bar, is often used to minimize the amount of vehicle lean and wheel deflection during vehicle cornering. Conventional sway bars are generally U-shaped, steel, rod-like devices which act as a torsion spring and are connected to either the front or rear wheel suspension system in such a way that if wheel deflection is unequal or in opposed directions, the sway bar resists the deflection in proportion to the forces tending to cause such deflection.

For example, when a vehicle is turning a corner, centrifugal force tends to cause the vehicle body to lean away from the turn which tends to cause the outer wheels to deflect up and the inner wheels to deflect down in relation to the vehicle. A sway bar resists this opposed deflection of the wheels and reduces the amount of lean thereby improving vehicle handling and ride characteristics. However, in certain vehicle operating conditions such as low speed off-road driving, it may be desired to reduce the sway bar effect or eliminate the sway bar effect altogether. It is to these ends that the present invention has been developed.

SUMMARY OF THE INVENTION

The present invention provides a sway bar assembly for an automotive vehicle which includes an actuator or latch device for modifying the sway bar operating characteristics or effectively decoupling the sway bar from the vehicle suspension system.

In accordance with one important aspect of the present invention a vehicle sway bar assembly is provided which includes a hydraulic actuator or latch operable to effectively couple and uncouple opposed sections of the sway bar with respect to each other to place the sway bar in operation or, effectively, deactivate the sway bar from having any effect on the vehicle suspension system.

In accordance with another aspect of the invention, a vehicle sway bar assembly is provided which includes an actuator or latch operable to modify the sway bar stiffness from a high stiffness operating condition to a low stiffness operating condition.

The present invention also provides a hydraulic latch device for effectively coupling and uncoupling a sway bar with respect to a vehicle suspension or modifying the sway bar operating characteristics. The hydraulic actuator or latch device is remotely controllable and includes a coupling and an anti-backlash mechanism which are both operable to reduce any slack or lost motion in the latch device which would adversely effect the sway bar operating characteristics.

Those skilled in the art will further appreciate the above noted features and advantages of the invention, together with other important aspects thereof upon reading the detailed description which follows in conjunction with the drawings.

BRIEF DESCRIPTION OF THE DRAWINGS

FIG. 1 is a view, in somewhat schematic form, of a vehicle suspension including a sway bar and latch assembly in accordance with the invention;

FIG. 2 is a longitudinal central section view of the sway bar latch or actuator device;

DESCRIPTION OF A PREFERRED EMBODIMENT

Figure 3:
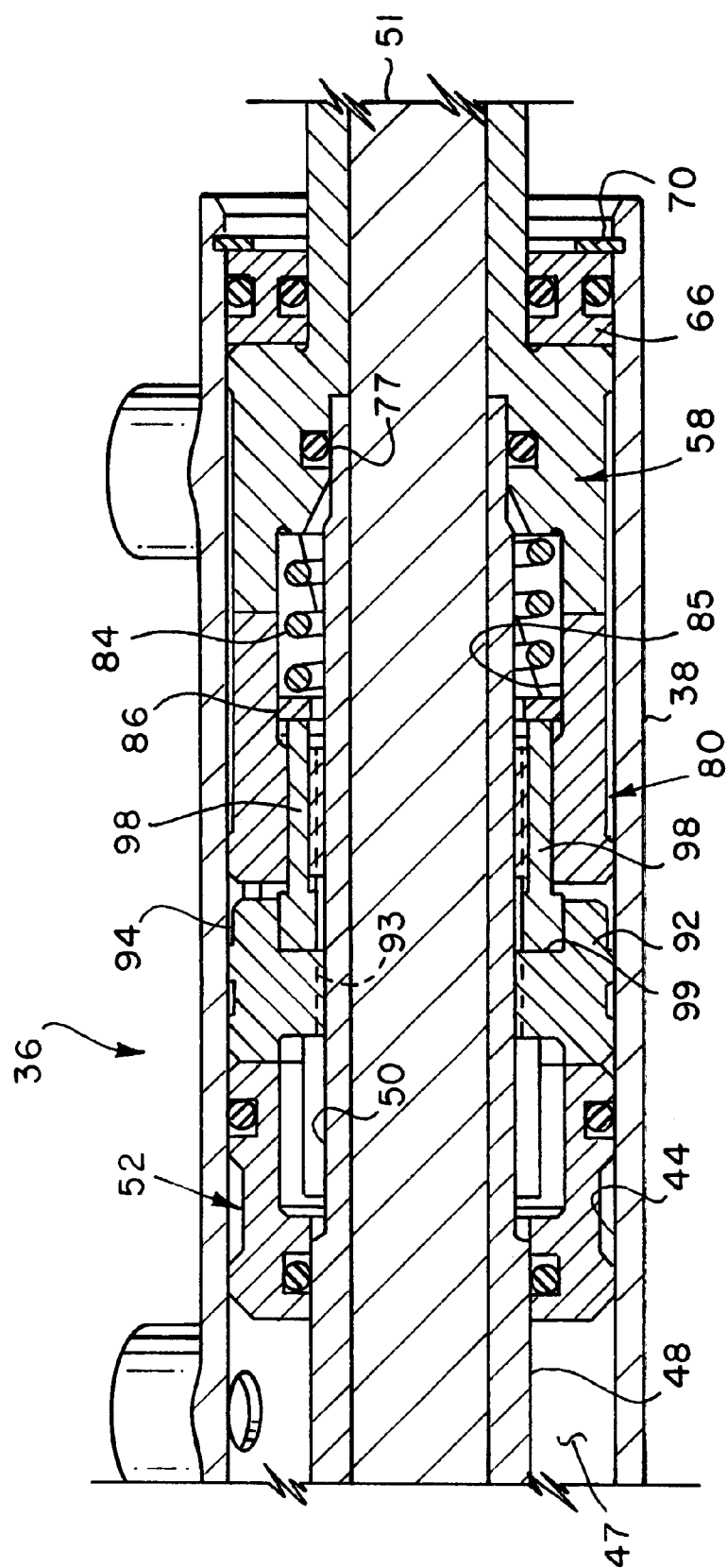
FIG. 3 is a section view illustrating certain components of the anti-backlash feature.

In the description which follows, like parts are marked throughout the specification and drawing with the same reference numerals, respectively. The drawing figures may not be to scale in the interest of clarity and conciseness.

Referring to FIG. 1, there is illustrated a portion of an automotive vehicle including a body or frame 10 supported by spaced apart pneumatic tired wheels 12 which are connected to the body 10 by suitable suspension linkages 14 and 16, respectively. A sway or anti-roll bar assembly 18 is supported on the body 10 and is also connected to the suspension linkages 14 and 16 by suitable intermediate links 20 and 22. Conventional automotive vehicle sway bars are generally elongated U-shaped steel rod members which act somewhat like a torsion spring and are operable to react forces tending to tilt the vehicle frame or body, such as the body 10 when the vehicle is moving through a turn or "cornering". In the sway bar assembly 18, the conventional U-shaped sway bar has been replaced by, for example, an elongated bar member 24 which has an angled end part 26, shown partially deflected, and connected to the link 20. A second, substantially identical sway bar member 28 includes an angled end part 30, shown partially deflected and connected to the suspension link 22. The sway bar members 24 and 28 are coaxially mounted in suitable bushings or bearings 34 spaced apart on the body 10 and which permit rotation of the bar members about their longitudinal axis 23. The sway bar members 24 and 28, if assembled directly to each other, would form the aforementioned U-shaped sway bar of the prior art.

However, the sway bar assembly 18 of the present invention includes a actuator or latch device 36 connected to the sway bar members 24 and 28, such device being characterized further herein as a sway bar latch. Moreover, as will be appreciated from the further description herein, the sway bar members 24 and 28 may be integrally joined to each other and provided with a bar section having a different spring rate than the spring rate of the bar members 24 and 28. The sway bar latch 36 provides for connecting the sway bar members 24 and 28 to each other so that forces exerted on one bar member are transmitted directly to the other member through the sway bar latch 36. Alternatively, the sway bar latch 36 may be controlled to effectively decouple the sway bar members 24 and 28 from each other so that they become ineffective with respect to exerting any forces on the suspension linkages for the wheels 12 or reacting any of the forces acting on the wheels through the body 10. Still further, however, the sway bar latch 36 may be operable to modify the effectiveness of the sway bar members 24 and 28 on the vehicle suspension if the sway bar members 24 and 28 are connected directly to each other through a solid or hollow sway bar section, as will be described in further detail herein.

Figure 4:
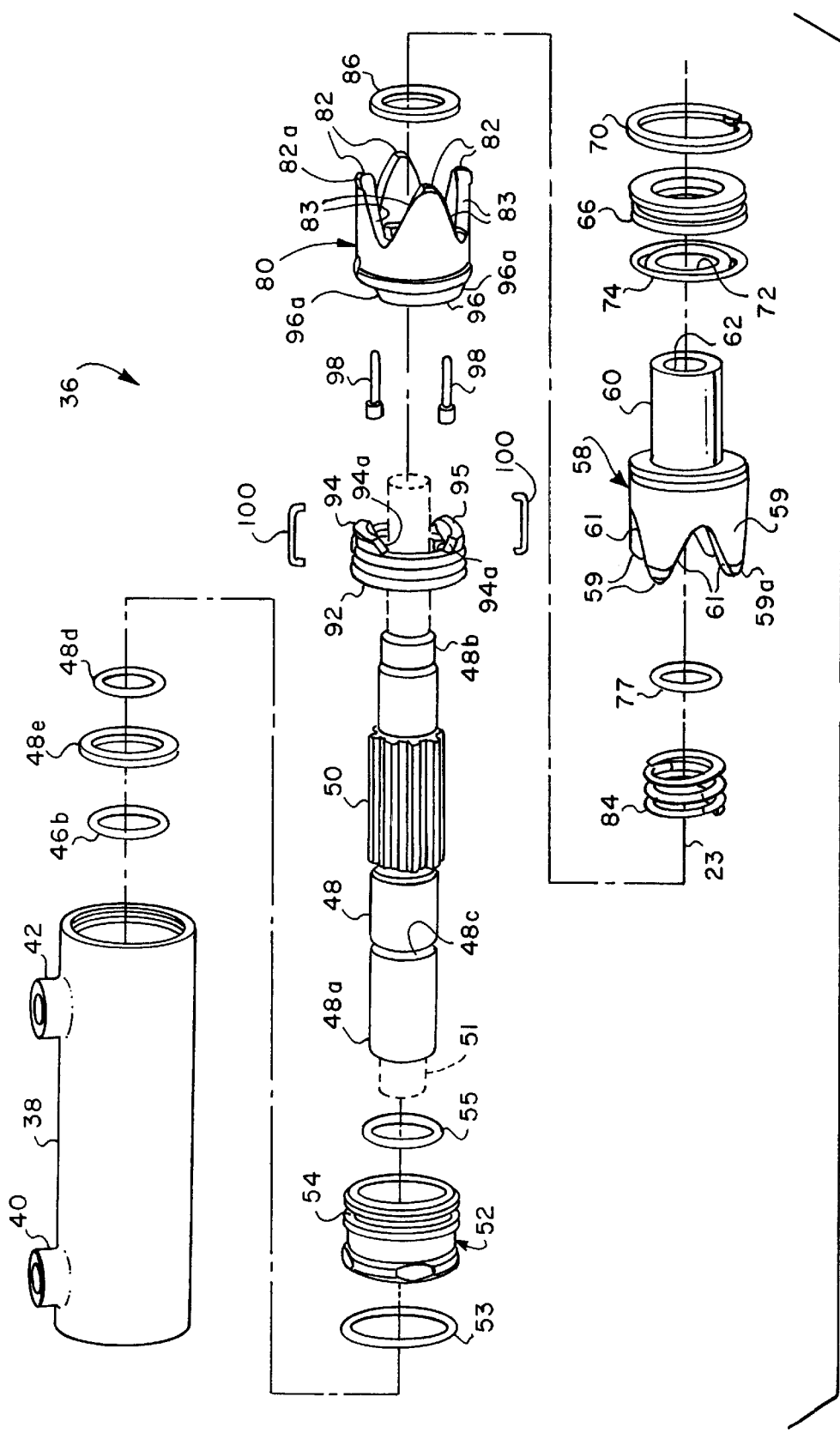
FIG. 4 is an exploded perspective view of the latch or actuator device shown in FIGS. 2 and 3.

Referring now primarily to FIGS. 2 and 4, the sway bar latch 36 includes a generally cylindrical housing 38 having spaced apart bosses 40 and 42 defining fluid communication ports 40a and 42a opening to interior chambers of the housing which are delimited by a cylindrical bore 44. The housing 38 includes an integral transverse endwall 46, FIG. 2, having a reduced diameter bore 46a formed therein for receiving one end of an elongated cylindrical tubular shaft 48 provided with a central longitudinal bore 49.

As shown in FIG. 2, an end 48a of shaft 48 extends from the housing 38 through the bore 46a and is engaged with a suitable o-ring seal 46b.

Shaft 48 also may be provided with, for example, internal splines 48s for receiving one end 24a of sway bar member 24 which may include external splines 24s engageable with splines 48s to allow coupling the shaft 48 to the sway bar member 24 non-rotatably relative thereto. Alternatively, the end of the sway bar member 24 may be coupled to the end 48a of shaft 48 by a suitable flange type coupling or the like and the bore 49 of shaft 48 may receive a centering or centralizing shaft therein and extending entirely therethrough.

FIG. 4 indicates how a substitute centering shaft 51 may be provided extending through the bore 49 of shaft 48 from one end to the other, if desired. The shaft 48 includes external splines 50 extending over a portion thereof between the end 48a and the opposite shaft end 48b. End 48b is of a diameter slightly less than the diameter of the shaft end 48a. A suitable split retaining ring locating groove 48c is formed in shaft 48 adjacent the end 48a. A suitable split retaining ring 48d is disposed in groove 48c and engageable with a retainer washer 48e sleeved over shaft 48 and engageable with endwall 46.

Referring further to FIGS. 2 and 4, a cylindrical tubular piston 52 is disposed in sleeved relationship over the shaft 48 and is disposed in sealing engagement with the housing bore 44 by a suitable elastomer o-ring type seal 53 disposed in a circumferential groove 54, FIG. 2. The piston 52 also supports an inner o-ring seal 55 slidably engaged with the shaft 48, also as shown in FIG. 2. Pressure fluid introduced into a chamber 47 formed between the housing endwall 46 and the piston 52 is operable to urge the piston to the right, viewing FIG. 2, for a purpose to be described in further detail herein.

The opposite end of the housing 38 is operable to receive a generally cylindrical latch member 58 therein and including a cylindrical tubular hub part 60 extending from the end of the housing 38 opposite the end 46. The hub 60 of latch member 58 is provided with a bore 62 including internal splines 62s for receiving the end 28a of sway bar member 28. Sway bar member 28 includes external splines 28s formed thereon cooperable with splines 62s so that members 58 and 28 are non-rotatable relative to each other. As previously mentioned, an alternative connection between the sway bar member 28 and the latch member 58 may be through a flanged connection between the hub 60 and the sway bar member 28 if space for a centering shaft 51 is required. A removable end cap 66 is retained in the housing 38 by a retaining ring 70. End cap 68 is provided with inner and outer circumferential grooves for receiving o-ring seals 72 and 74 adapted to be in fluid tight sealing engagement with the hub 60 and with the bore wall 44, as shown in FIG. 2. As also shown in FIG. 2, the latch member 58 includes a slightly enlarged bore part 62a for receiving the end 48b of shaft 48 and a pressure fluid seal is provided by an o-ring member 77 in sealing engagement with the shaft end 48b and disposed in a suitable groove in the bore 62a.

As shown in FIG. 4, the latch member 58 has circumferentially spaced axially projecting and tapered teeth 59 and somewhat v-shaped or tapered slots 61 interposed the teeth for receiving cooperating teeth of a latch member 80, FIGS. 2 and 4. Latch member 80 also includes cooperating axially projecting and tapered teeth 82. The tips of the teeth 82 have radially outwardly projecting guide surfaces 82a which are engageable with the wall defining bore 44 to centralize the latch member 80 in the housing 38. In the same manner, the teeth 59 of latch member 58 also include radially outwardly projecting guide surfaces 59a, see FIG. 3, for guiding and centralizing the latch member 58 in the bore 44. The latch members 58 and 80 are adapted to move axially relative to each other so that the teeth 59 may engage the teeth 82 by projecting into the v-shaped recesses 83, FIG. 4, interposed the teeth 82 while at the same time the teeth 82 enter the recesses 61 interposed the teeth 59.

The shapes of the teeth 59 and 82 are such as to provide cooperating side edge surfaces which are inclined to axis 23. In this way, the latch members 58 and 80 are operable to rotate relative to each other as the teeth 59 and 82 engage so as to assume a predetermined relationship that will result in rotationally indexing or centering the sway bar members 24 and 28 with respect to each other about the axis 23, FIGS. 1 and 2. Accordingly, the sway bar members 24 and 28 are always in the same rotational position with respect to each other, when engaged through the latch 36, and are operable to transmit suspension reaction forces between the suspension linkages and the body of the vehicle on which the sway bar assembly 18 is mounted.

Referring further to FIGS. 2, 3 and 4, a coil spring 84 is interposed the latch members 58 and 80, is somewhat journaled in a bore 85 in latch member 80 and by the teeth 59 and 82, and is engageable with a ring 86 disposed in bore 85, as shown in FIGS. 2 and 3. The latch member 80 also includes a hub portion 89 fitted with internal splines 89a and supported on the shaft 48 in axially slidable splined engagement with the splines 50. Accordingly, when the teeth 59 and 82 are forcibly engaged with each other, the sway bar members 24 and 28 are coupled by way of the shaft 48, the latch member 80 and the latch member 58. However, if the latch members 58 and 80 move axially away from each other to provide clearances between the side edges of the teeth 59 and 82, rotational lost motion is provided between the sway bar members 24 and 28 to the extent that the sway bar members effectively become decoupled.

Referring still further to FIGS. 2, 3, and 4, the sway bar latch 36 also includes an anti-backlash lock member comprising a generally cylindrical part 92 having opposed axially projecting lock dogs 94 formed thereon, each with opposed axially inclined camming surfaces 94a, as shown in FIG. 4. Surfaces 94a cooperate with corresponding surfaces 96a formed on opposed axially projecting dogs 96 formed on the latch member 80, also as shown in FIG. 4. The anti-backlash lock member 92 is loosely coupled to the latch member 80 by elongated sockethead pin fasteners 98, as shown in FIGS. 3 and 4 and by opposed somewhat U-shaped retaining links 100, shown in FIGS. 2 and 4. Lock member 92 is axially slidably mounted on shaft 48 and includes internal splines 93 engageable with splines 50. Pins 98 are disposed at one end in a recess in lock member 92 delimited by a transverse wall 99, FIG. 3.

As shown in FIG. 2, the latch 36 may be connected to a source of hydraulic pressure fluid including a pump 108, an accumulator 110, a pressure regulator 112, a solenoid operated valve 114 and a suitable reservoir 116. In the position of the solenoid operated valve 114 shown in FIG. 2, high pressure hydraulic fluid is applied to chamber 47 via a conduit 115 and port 40a while a chamber formed within the bore 44, essentially to the right of the piston ring seals 53 and 55 is vented through port 42a, a conduit 117 and the valve 114 to the reservoir 116 at a reduced pressure. Piston 52 thus biases the anti-backlash lock member 92 into full engagement with the latch member 80 at the cooperating camming surfaces 94a and 96a. Anti-backlash lock member 92 and latch member 80 are forced to move axially on shaft 48 and latch member 80 is operable to fully engage the latch member 58. Both the latch member 80 and the lock member 92 are splined to the external splines 50 on shaft 48 and as a consequence of the inclined surfaces 94a and 96a fully engaging each other, the members 80 and 92 tend to rotate relative to each other to eliminate any backlash between the splined connection of the latch member 80 and the shaft 48. Moreover, as previously explained, the axially inclined surfaces of the teeth 82 and 59 cause the latch members 58 and 80 to rotate with respect to each other to index or rotationally align the sway bar members 24 and 28 with respect to each other as the latch members are fully engaged. In the condition described, the sway bar assembly 18 operates in the manner of a conventional single piece sway bar or anti-roll bar.

However, under certain vehicle operating conditions, it may be desirable to decouple or modify the action of the sway bar assembly 18 by, for example, decoupling the sway bar members 24 and 28 to the extent that no sway bar action is imposed on the body 10 or the suspension linkages interconnecting the body with the wheels 12. When valve 114 is shifted to its alternate position, chamber 47 is vented to the reservoir 116 and the chamber exposed to the port 42a, including essentially the major portion of the interior of the housing or cylinder 38 to the right of the seals 53 and 55, is under high pressure and the piston 52 is retracted to the left, viewing FIG. 2, toward endwall 46. This action allows the spring 84 to act on the pins 98 through the ring 86, FIG. 3, causing the pins to move the anti-backlash lock 92 axially toward endwall 46 out of forcible engagement with the latch member 80. The members 92 and 80 remain engaged by links 100, however.

With the latch members 58 and 80 now not forcibly engaged, any twisting action of the sway bar members 24 and 28 in opposite directions will cause the latch members to act on each other pushing the latch member 80 along shaft 48 further apart from member 58 and allowing rotation between them thanks to the axially tapered teeth 59 and 82. Accordingly, no effective sway bar action is imposed on the vehicle. The anti-backlash lock member 92 and the piston 52 may be pushed toward the endwall 46 of the cylinder housing 38, however, the teeth 59 and 82 never fully disengage. This action of course prevents re-indexing of the latch members 58 and 80 and allows the latch 36 to self center when re-engaged to restore the sway bar to its original working condition.

Referring again to FIG. 2, the sway bar assembly 18 may be modified by interconnecting the sway bar members 24 and 28 by a bar section 118, for example, which may be a hollow tubular section or a section having a different torsional stiffness than the sway bar members 24 and 28. Accordingly, if the sway bar assembly 18 is modified to include an integral sway bar section 118 interconnecting the sway bar members 24 and 28, the sway bar would not become completely decoupled in response to moving the latch members 58 and 82 to their partially disengaged positions. In other words, with the latch members 80 and 58 in their partially disengaged position any torsional action imposed on the sway bar members 24 and 28 would be transmitted from one to the other through the sway bar section 118 and, for example, the spring rate of the sway bar would be reduced or modified from that which would be experienced when the latch members 80 and 58 were fully engaged.

Accordingly, the sway bar assembly 18 could be configured as just described to be operable to modify its operating characteristics from the condition when the latch members 80 and 58 were fully engaged to the condition where the latch members were in their partially disengaged condition with the teeth 59 and 82 not forcibly engaged with each other. With the sway bar assembly 18 modified to include the sway bar section 118 non-rotatably joined to the sway bar members 24 and 28, the sway bar assembly may be controlled to operate in a high stiffness mode and a low stiffness mode, respectively. The sway bar section 118 may also be a solid section of the same diameter and material as the bar members 24 and 28.

The construction and operation of the sway bar assembly 18 is believed to be readily understandable to those of ordinary skill in the art based on the foregoing description. The sway bar assembly 18 may be constructed using conventional engineering materials for automotive vehicle sway bar assemblies and for hydraulic actuators, respectively. The control valve 114 may be remotely actuated from the vehicle cabin or may be otherwise controlled. The pump 108 may, of course, be driven by the vehicle engine or by another suitable onboard power source.

Although preferred embodiments of the invention have been described in detail herein, those skilled in the art will recognize that various substitutions and modifications may be made to the invention without departing from the scope and spirit of the appended claims.

What is claimed is:

1. In an automotive vehicle suspension system a sway bar assembly adapted to minimize vehicle lean and wheel deflection during vehicle cornering, and the improvement comprising a self-centering latch operable to modify the operating effect of said sway bar assembly on said vehicle; wherein:

said latch includes opposed latch members operable to be engaged to provide for a first stiffness condition of said sway bar assembly and said latch members being operable to be at least partially disengaged to provide for one of decoupling said sway bar assembly from imposing any effect on said vehicle suspension and reducing the stiffness of said sway bar assembly;

said latch members are biased into engagement with each other by pressure fluid;

said latch includes a housing, said latch members being disposed in said housing for axial movement therein and a piston slidably disposed in said housing and operable to urge said latch members to said engaged condition; and said latch includes an elongated shaft member disposed at least partially in said housing, one of said latch members being keyed for axial rotation with said shaft but being axially slidable on said shaft and engageable with the other of said latch members.

2. The sway bar assembly set forth in claim 1 wherein:

said one latch member is engaged with said shaft by cooperating splines formed on said shaft and said one latch member and said latch includes an anti-backlash lock member operably engaged with said one latch member operable to reduce rotational displacement between said one latch member and said shaft when said one latch member is fully engaged with the other of said latch members.

3. The sway bar assembly set forth in claim 2 including:
means for effectively disengaging said anti-backlash lock member from said one latch member when said latch members are moved to partially disengage from each other.

4. The sway bar assembly set forth in claim 2 wherein:
said anti-backlash lock member and said one latch member include cooperating surfaces formed thereon, respectively, and responsive to engagement of said anti-backlash lock member with said one latch member to urge said latch member to rotate on said shaft relative to said anti-backlash lock member.

5. The sway bar assembly set forth in claim 4 including:
at last one pin providing a coupling between said anti-backlash lock member and said one latch member and spring means operable to engage said pin for urging said pin to move said anti-backlash lock member relative to said one latch member to release forcible engagement therebetween.

6. A sway bar assembly for an automotive vehicle suspension system, comprising:
opposed first and second sections of said sway bar assembly interconnected to each other through a third sway bar section; and
a self-centering latch operable to be in a first state to provide a first condition of stiffness of said sway bar assembly and a second state to provide another condition of stiffness of said sway bar assembly, wherein:
said latch is sleeved over said sway bar assembly between opposite ends thereof and includes a first latch member connected to said sway bar assembly at a first location, a second latch member connected to said sway bar assembly at a second location and said third section of said sway bar assembly is positioned over said first location and said second location;
said latch members are operable to be engaged to provide said first stiffness condition of said sway bar assembly and said latch members are operable to be at least partially disengaged to provide for reducing the stiffness of said sway bar assembly; and
said latch members are biased into engagement with each other by pressure fluid; and
said latch includes a housing, said latch members being disposed in said housing for axial movement therein and a piston slidably disposed in said housing and operable to urge said latch members to said engaged condition.

7. A sway bar assembly for an automotive vehicle suspension system, comprising:
separate opposed sections of said sway bar assembly;
a self-centering latch operable to modify the operating effect of said sway bar assembly on said vehicle suspension system, said latch including opposed latch members operable to be engaged to provide for a first stiffness condition of said sway bar assembly and said latch members being operable to be at least partially disengaged to provide for decoupling said sway bar assembly from imposing any effect on said vehicle suspension; and
said latch includes an elongated shaft, one of said latch members being keyed for axial rotation with said shaft but being axially slidable on said shaft and angageable with the other of said latch members.

8. The sway bar assembly set forth in claim 7 wherein:
said one latch member is engaged with said shaft by cooperating splines formed on said shaft and said one latch member.

9. The sway bar assembly set forth in claim 8 wherein:
said latch includes an anti-backlash lock member operably engaged with said one latch member and operable to reduce rotational displacement between said one latch member and said shaft when said one latch member is fully engaged with the other of said latch members.

10. The sway bar assembly set forth in claim 9 including:
means for effectively disengaging said anti-backlash lock member from said one latch member when said latch members are moved to partially disengage from each other.

11. In an automotive vehicle suspension system a sway bar assembly adapted to minimize vehicle lean and wheel deflection during vehicle cornering, and the improvement comprising a latch operable to modify the operating effect of said sway bar assembly on said vehicle;
wherein, said latch includes opposed latch members operable to be engaged to provide for a first stiffness condition of said sway bar assembly and said latch members being operable to be at least partially disengaged to provide for one of decoupling said sway bar assembly from imposing any effect on said vehicle suspension and reducing the stiffness of said sway bar assembly;
wherein, said latch members are biased into engagement with each other by pressure fluid;
wherein, said latch includes a housing, said latch members being disposed in said housing for axial movement therein and a piston slidably disposed in said housing and operable to urge said latch members to said engaged condition; and
wherein, said latch includes an elongated shaft member disposed at least partially in said housing, one of said latch members being keyed for axial rotation with said shaft but being axially slidable on said shaft and engageable with the other of said latch members.

12. The sway bar assembly set forth in claim 11 wherein:
said one latch member is engaged with said shaft by cooperating splines formed on said shaft and said one latch member and said latch includes an anti-backlash lock member operably engaged with said one latch member operable to reduce rotational displacement between said one latch member and said shaft when said one latch member is fully engaged with the other of said latch members.

13. The sway bar assembly set forth in claim 12 including:
means for effectively disengaging said anti-backlash lock member from said one latch member when said latch members are moved to partially disengage from each other.

14. The sway bar assembly set forth in claim 12 wherein:
said anti-backlash lock member and said one latch member include cooperating surfaces formed thereon, respectively, and responsive to engagement of said anti-backlash lock member with said one latch member to urge said latch member to rotate on said shaft relative to said anti-backlash lock member.

15. The sway bar assembly set forth in claim 14 including:
at last one pin providing a coupling between said anti-backlash lock member and said one latch member and spring means operable to engage said pin for urging said pin to move said anti-backlash lock member relative to said one latch member to release forcible engagement therebetween.

16. A sway bar assembly for an automotive vehicle suspension system, comprising:

opposed first and second sections of said sway bar assembly interconnected to each other through a third sway bar section; and a latch operable to be in a first state to provide a first condition of stiffness of said sway bar assembly and a second state to provide another condition of stiffness of said sway bar assembly, wherein the sway bar assembly also provides continuously variable conditions of stiffness between the first condition and the second condition;

wherein, said latch is sleeved over said sway bar assembly between opposite ends thereof and includes a first latch member connected to said sway bar assembly at a first location, a second latch member connected to said sway bar assembly at a second location and said third section of said sway bar assembly is positioned over said first location and said second location;

wherein, said latch members are operable to be engaged to provide said first stiffness condition of said sway bar assembly and said latch members are operable to be at least partially disengaged to provide for reducing the stiffness of said sway bar assembly;

wherein, said latch members are biased into engagement with each other by pressure fluid; and wherein, said latch includes a housing, said latch members being disposed in said housing for axial movement therein and a piston slidably disposed in said housing and operable to urge said latch members to said engaged condition.

17. A sway bar assembly for an automotive vehicle suspension system, comprising:

separate opposed sections of said sway bar assembly; and a latch operable to modify the operating effect of said sway bar assembly on said vehicle suspension system, said latch including opposed latch members operable to be engaged to provide for a first stiffness condition of said sway bar assembly and said latch members being operable to be at least partially disengaged to provide for decoupling said sway bar assembly from imposing any effect on said vehicle suspension;

wherein, said latch includes an elongated shaft, one of said latch members being keyed for axial rotation with said shaft but being axially slidable on said shaft and engageable with the other of said latch members.

18. The sway bar assembly set forth in claim 17 wherein:

said one latch member is engaged with said shaft by cooperating splines formed on said shaft and said one latch member.

19. The sway bar assembly set forth in claim 18 wherein:

said latch includes an anti-backlash lock member operably engaged with said one latch member and operable to reduce rotational displacement between said one latch member and said shaft when said one latch member is fully engaged with the other of said latch members.

20. The sway bar assembly set forth in claim 19 including:

means for effectively disengaging said anti-backlash lock member from said one latch member when said latch members are moved to partially disengage from each other.

* * * * *